(12) United States Patent
Hart et al.

(10) Patent No.: US 7,794,352 B2
(45) Date of Patent: Sep. 14, 2010

(54) MULTI-SPEED TRANSMISSION

(75) Inventors: James M. Hart, Belleville, MI (US);
Andrew W. Phillips, Saline, MI (US);
Clinton E. Carey, Monroe, MI (US);
Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 351 days.

(21) Appl. No.: 11/969,267

(22) Filed: Jan. 4, 2008

(65) Prior Publication Data
US 2008/0261758 A1 Oct. 23, 2008

Related U.S. Application Data

(60) Provisional application No. 60/913,255, filed on Apr. 20, 2007.

(51) Int. Cl.
*F16H 3/62* (2006.01)
(52) U.S. Cl. .................................................... 475/275
(58) Field of Classification Search ................ 475/275, 475/282
See application file for complete search history.

(56) References Cited

U.S. PATENT DOCUMENTS

| | | |
|---|---|---|
| 6,176,803 B1 | 1/2001 | Meyer |
| 6,342,026 B1 | 1/2002 | Takagi |
| 6,547,688 B2 | 4/2003 | Takagi |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Lee et al. |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |
| 7,011,597 B2 | 3/2006 | Haka |
| 7,014,589 B2 | 3/2006 | Stevenson |
| 7,128,683 B2 | 10/2006 | Oguri |
| 7,163,484 B2 | 1/2007 | Klemen |
| 2006/0019791 A1 | 1/2006 | Baldwin |
| 2006/0270514 A1 | 11/2006 | Oguri |
| 2006/0270516 A1 | 11/2006 | Klemen |
| 2008/0182706 A1* | 7/2008 | Phillips et al. .............. 475/276 |
| 2008/0261756 A1* | 10/2008 | Carey et al. ................. 475/276 |
| 2008/0261757 A1* | 10/2008 | Wittkopp et al. ............ 475/276 |
| 2008/0261758 A1* | 10/2008 | Hart et al. ................... 475/276 |
| 2008/0261767 A1* | 10/2008 | Phillips et al. .............. 475/282 |
| 2009/0197733 A1* | 8/2009 | Phillips et al. .............. 475/276 |

* cited by examiner

Primary Examiner—Dirk Wright

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

10 Claims, 5 Drawing Sheets

| GEAR STATE | GEAR RATIO | RATIO STEP | CLUTCHING ELEMENTS ||||| 
|---|---|---|---|---|---|---|---|
| | | | 34 | 26 | 30 | 32 | 28 |
| Rev | -3.276 | | X | | | | X |
| N | | -0.71 | O | | | | |
| 1st | 4.600 | | X | | X | | |
| 2nd | 3.014 | 1.53 | X | | | X | |
| 3rd | 2.021 | 1.49 | X | X | | | |
| 4th | 1.504 | 1.34 | | X | | X | |
| 5th | 1.274 | 1.18 | | X | X | | |
| 6th | 1.118 | 1.14 | | X | | | X |
| 7th | 0.835 | 1.34 | | | X | | X |
| 8th | 0.655 | 1.27 | | | | X | X |

X = On, carrying torque
O = On, NOT carrying torque

| GEAR STATE | GEAR RATIO | RATIO STEP | CLUTCHING ELEMENTS ||||| 
|---|---|---|---|---|---|---|---|
| | | | 134 | 130 | 126 | 132 | 128 |
| Rev | -3.533 | | X | | | | X |
| N | | -0.77 | O | | | | |
| 1st | 4.600 | | X | X | | | |
| 2nd | 3.067 | 1.50 | X | | | X | |
| 3rd | 1.870 | 1.64 | X | | X | | |
| 4th | 1.189 | 1.57 | | | X | X | |
| 5th | 1.000 | 1.19 | | X | X | | |
| 6th | 0.943 | 1.06 | | | X | | X |
| 7th | 0.846 | 1.11 | | X | | | X |
| 8th | 0.667 | 1.27 | | | | X | X |

X = On, carrying torque
O = On, NOT carrying torque

| GEAR STATE | GEAR RATIO | RATIO STEP | CLUTCHING ELEMENTS ||||| 
|---|---|---|---|---|---|---|---|
| | | | 234 | 226 | 230 | 232 | 228 |
| Rev | -3.276 | | X | | | | X |
| N | | -0.71 | O | | | | |
| 1st | 4.600 | | X | | X | | |
| 2nd | 3.014 | 1.53 | X | | | X | |
| 3rd | 2.021 | 1.49 | X | X | | | |
| 4th | 1.504 | 1.34 | | X | | X | |
| 5th | 1.274 | 1.18 | | X | X | | |
| 6th | 1.118 | 1.14 | | X | | | X |
| 7th | 0.835 | 1.34 | | | X | | X |
| 8th | 0.655 | 1.27 | | | | X | X |

X = On, carrying torque
O = On, NOT carrying torque

FIG. 9

MULTI-SPEED TRANSMISSION

CROSS-REFERENCE TO RELATED APPLICATIONS

This application claims the benefit of U.S. Provisional Application No. 60/913,255, filed on Apr. 20, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes an input member, an output member, first, second, third and fourth planetary gear sets each having first, second and third members, a first interconnecting member continuously interconnecting the first member of the first planetary gear set with a stationary element, a second interconnecting member continuously interconnecting the third member of the first planetary gear set with the first member of the second planetary gear set, a third interconnecting member continuously interconnecting the third member of the second planetary gear set with the third member of the third planetary gear set, a fourth interconnecting member continuously interconnecting the first member of the third planetary gear set with the third member of the fourth planetary gear set, and a fifth interconnecting member continuously interconnecting the second member of the third planetary gear set with the second member of the fourth planetary gear set. Five torque-transmitting mechanisms are selectively engageable to interconnect one of the first, second, and third members with another of the first, second, third members, and the stationary element. The torque-transmitting mechanisms are selectively engageable in combinations of at least two to establish at least eight forward speed ratios and at least one reverse speed ratio between the input member and the output member.

In one aspect of the present invention, a first of the five torque transmitting mechanisms is selectively engageable to interconnect the second member of the first planetary gear set with the third member of the second planetary gear set.

In another aspect of the present invention, a second of the five torque transmitting mechanisms is selectively engageable to interconnect the second member of the first planetary gear set with the first member of the third planetary gear set.

In yet another aspect of the present invention, a third of the five torque transmitting mechanisms is selectively engageable to interconnect the second member of the second planetary gear set with the first member of the third planetary gear set.

In yet another aspect of the present invention, a fourth of the five torque transmitting mechanisms is selectively engageable to interconnect the first member of the second planetary gear set with the first member of the third planetary gear set.

In yet another aspect of the present invention, a fifth of the five torque transmitting mechanisms is selectively engageable to interconnect the first member of the fourth planetary gear set with the stationary element.

In yet another aspect of the present invention, the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a ring gear, the third member of the second planetary gear set is a carrier member, the first member of the third planetary gear set is a sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

Another embodiment of the transmission of the present invention includes an input member, an output member, first, second, third and fourth planetary gear sets each having first, second and third members, wherein the input member is continuously interconnected with the second member of the first planetary gear set and wherein the output member is continuously interconnected with the second member of the fourth planetary gear set, a first interconnecting member continuously interconnecting the first member of the first planetary gear set with a stationary element, a second interconnecting member continuously interconnecting the third member of the first planetary gear set with the first member of the second planetary gear set, a third interconnecting member continuously interconnecting the third member of the second planetary gear set with the third member of the third planetary gear set, a fourth interconnecting member continuously interconnecting the first member of the third planetary gear set with the third member of the fourth planetary gear set, and a fifth interconnecting member continuously interconnecting the second member of the third planetary gear set with the second member of the fourth planetary gear set. A first torque transmitting mechanism is selectively engageable to interconnect the second member of the first planetary gear set with the third member of the second planetary gear set. A second torque transmitting mechanism is selectively engageable to interconnect the second member of the first planetary gear set with the first member of the third planetary gear set. A third torque transmitting mechanism is selectively engageable to interconnect the second member of the second planetary gear set with the first member of the third planetary gear set. A fourth torque transmitting mechanism is selectively engageable to interconnect the third member of the first planetary gear set with the first member of the third planetary gear set. A fifth torque transmitting mechanism is selectively engageable to interconnect the first member of the fourth planetary gear set with the stationary element. The torque transmitting mechanisms are selectively engageable in combinations of at least two to establish at least eight forward speed ratios and at least one reverse speed ratio between the input member and the output member.

In one embodiment of the transmission of the present invention, the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a ring gear, the third member of the second planetary gear set is a carrier member, the first member of the third planetary gear set is a sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 9 is a truth table presenting the state of engagement of the various torque transmitting clutches and brakes in each of the available forward and reverse speeds or gear ratios of the transmission illustrated in FIGS. 7 and 8.

DETAILED DESCRIPTION

The following description is merely exemplary in nature and is not intended to limit the present disclosure, application, or uses.

At the outset, it should be appreciated that the first, second, and the third embodiments of the eight speed automatic transmission of the present invention have an arrangement of permanent mechanical connections between the elements of the four planetary gear sets in common. These mechanical connections generically link or relate the three transmission embodiments. A first component or element of a first planetary gear set is permanently coupled to a ground. A second component or element of the first planetary gear set is permanently coupled to a second component or element of a second planetary gear set. A first component or element of the second planetary gear set is permanently coupled to a first component or element of a third planetary gear set. A second component or element of the third planetary gear set is permanently coupled to a second component or element of a fourth planetary gear set. Finally, a third component or element of the third planetary gear set is permanently coupled to a third component or element of the fourth planetary gear set.

Figure 1:
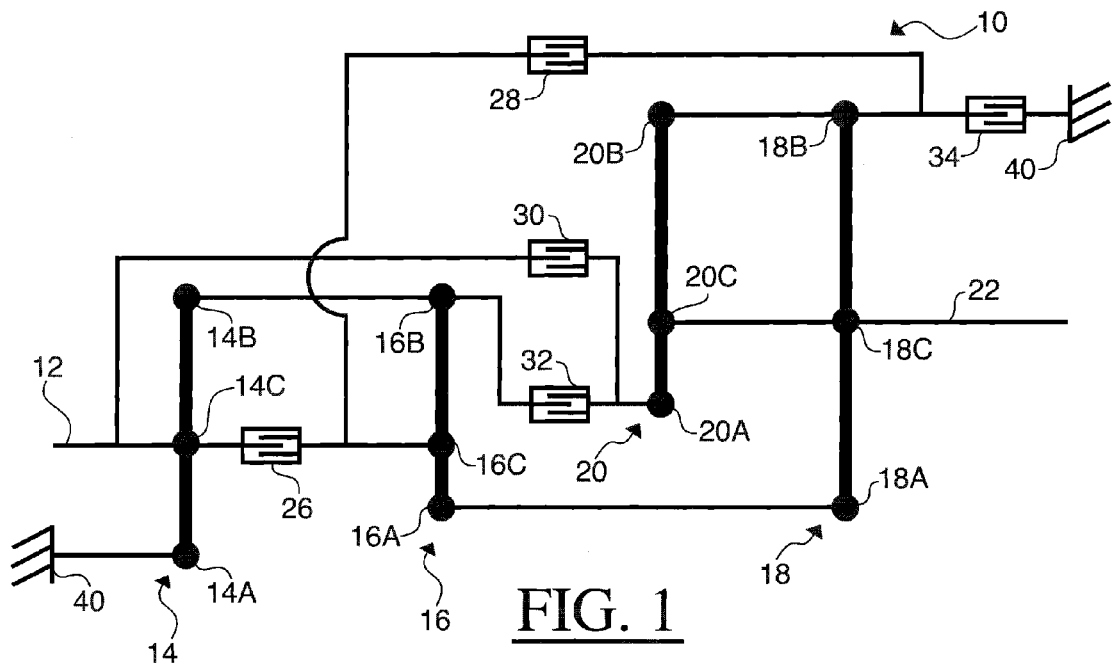
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input 12 is coupled to the third node 14C of the first planetary gear set. The output 22 is coupled to the third node 18C of the third planetary gear set 18. The first node 14A of the first planetary gear set 14 is coupled to a ground or transmission housing 40. The second node 14B of the first planetary gear set 14 is coupled to the second node 16B of the second planetary gear set 16. The first node 16A of the second planetary gear set 16 is coupled to the first node 18A of the third planetary gear set 18. The second node 18B of the third planetary gear set 18 is coupled to a second node 20B of the fourth planetary gear set 20. The third node 18C of the third planetary gear set 18 is coupled to the third node 20C of the fourth planetary gear set 20.

A first clutch 26 selectively connects the third node 14C of the first planetary gear set 14 to the third node 16C of the second planetary gear set 16. A second clutch 28 selectively connects the third node 16C of the second planetary gear set 16 to the second node 18B of the third planetary gear set 18. A third clutch 30 selectively connects the input 12 and the third node 14C of the first planetary gear set 14 to the first node 20A of the fourth planetary gear set 20. A fourth clutch 32 selectively connects the second node 16B of the second planetary gear set 16 to the first node 20A of the fourth planetary gear set 20. A first brake 34 selectively connects the second node 18B of the third planetary gear set 18 to the ground or transmission housing 40.

Figure 2:
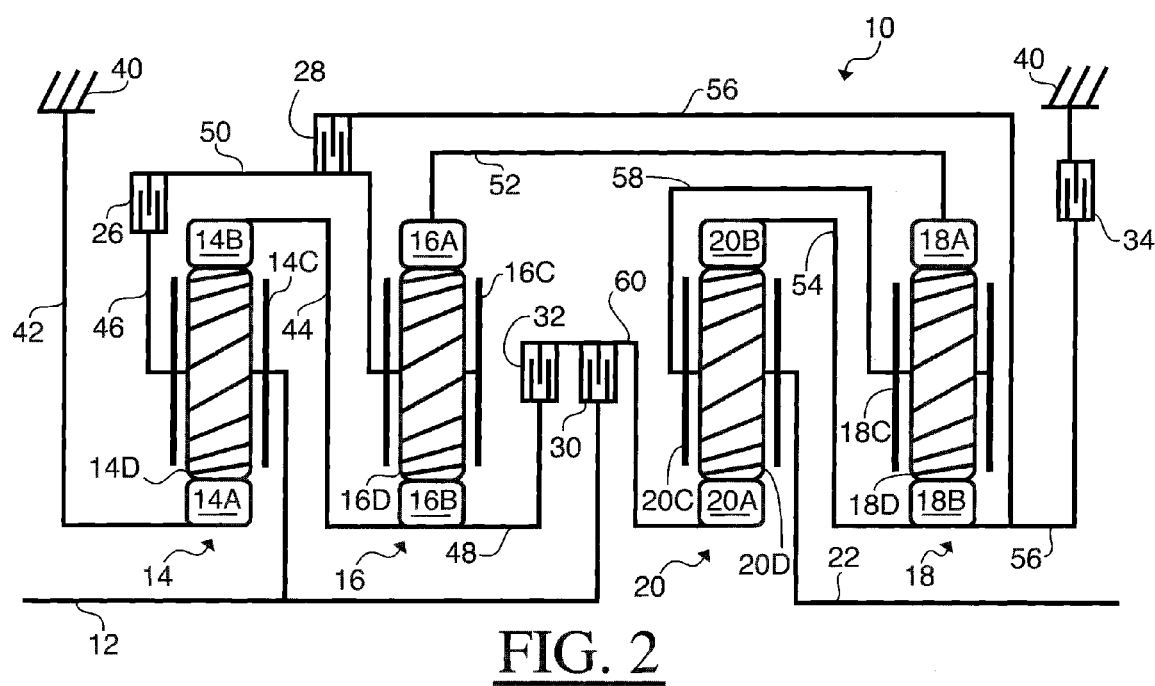
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 14 is a planetary gear set that includes a sun gear member 14A, a planet gear carrier member 14C and a ring gear member 14B. Sun gear member 14A is connected for common rotation with a first shaft or interconnecting member 42 which is fixed to the ground or transmission housing 40. Ring gear member 14B is connected to a second shaft or interconnecting member 44. The planet gear carrier member 14C rotatably supports a set of planet gears 14D (only one shown) and is connected for common rotation with a third shaft or interconnecting member 46 and the input 12. Planet gears 14D are configured to intermesh with sun gear member 14A and ring gear member 14B.

The input shaft or member 12 is continuously connected to an engine (not shown) or to a turbine of a torque converter (not shown). The output shaft or member 22 is continuously connected with the final drive unit or transfer case (not shown).

Planetary gear set 16 is a planetary gear set that includes a sun gear member 16B, a planet carrier member 16C that rotatably supports a set of planet gears 16D and a ring gear member 16A. Sun gear member 16B is connected for common rotation with the second interconnecting member 44 and a fourth shaft or interconnecting member 48. Planet carrier member 16C is connected for common rotation with a fifth shaft or interconnecting member 50. Ring gear member 16A is connected for common rotation with a sixth shaft or interconnecting member 52. Planet gears 16D are configured to intermesh with both sun gear member 16C and ring gear member 16A.

Planetary gear set 18 is a planetary gear set that includes a sun gear member 18B, a ring gear member 18A and a planet carrier member 18C that rotatably supports a set of planet gears 18D. Sun gear member 18B is connected for common rotation with a seventh shaft or interconnecting member 54 and to an eighth shaft or interconnecting member 56. Ring gear member 18A is connected for common rotation with the sixth interconnecting member 52. Planet carrier member 18C is connected for common rotation with a ninth shaft or interconnecting member 58. Planet gears 18D are configured to intermesh with both sun gear member 18B and ring gear member 18A.

Planetary gear set 20 is a planetary gear set that includes a sun gear member 20A, a ring gear member 20B and a planet carrier member 20C that rotatably supports a set of planet gears 20D. Sun gear member 20A is connected for common rotation with a tenth shaft or interconnecting member 60. Ring gear member 20B is connected for common rotation with the seventh interconnecting member 54. Planet carrier member 20C is connected for common rotation with the ninth interconnecting member 58 and to the output 22. Planet gears 20D are configured to intermesh with both sun gear member 20A and ring gear member 20B.

The torque-transmitting mechanisms or clutches 26, 28, 30, and 32 and the brake 34 allow for selective interconnection of the shafts or interconnecting members, members of the planetary gear sets and the housing. For example, the first clutch 26 is selectively engageable to connect the third interconnecting member 46 to the fifth interconnecting member 50. The second clutch 28 is selectively engageable to connect the fifth interconnecting member 50 to the eighth interconnecting member 56. The third clutch 30 is selectively engageable to connect the input 12 to the tenth interconnecting member 60. The fourth clutch 32 is selectively engageable to connect the fourth interconnecting member 48 to the tenth interconnecting member 60. The first brake 34 is selectively engageable to connect the eighth interconnecting member 56 to the ground or transmission housing 40 to restrict rotation of the eighth interconnecting member 56 relative to the housing 40.

Figures 3, 4:
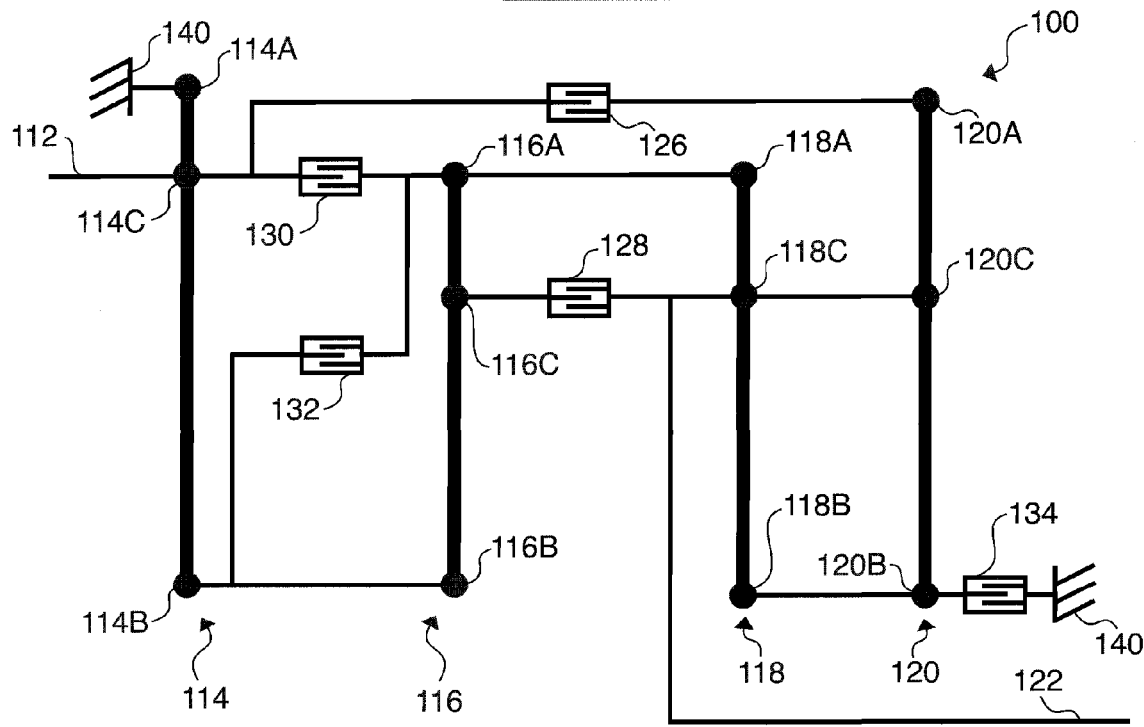
FIG. 3 is a truth table presenting the state of engagement of the various torque transmitting clutches and brakes in each of the available forward and reverse speeds or gear ratios of the transmission illustrated in FIGS. 1 and 2.
FIG. 4 is a lever diagram of another embodiment of an eight speed transmission according to the present invention.

Referring now to FIGS. 2 and 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, and first brake 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 34 and the second clutch 28 are engaged or activated. The first brake 34 connects the eighth interconnecting member 56 to the ground or transmission housing 40 to restrict rotation of the eighth interconnecting member 56 relative to the housing 40. The second clutch 28 connects the fifth interconnecting member 50 to the eighth interconnecting member 56. Likewise, the eight forward ratios are achieved through different combinations of clutch engagement, as shown in FIG. 3.

It will be appreciated that the foregoing explanation of operation and gear states of the eight speed transmission 10 assumes, first of all, that all the clutches and the brake not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 4, another embodiment of a transmission is illustrated and referenced by reference numeral 100. Transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input 112 is coupled to the third node 114C of the first planetary gear set 114. The output 122 is coupled to the third node 118C of the third planetary gear set 118. The first node 114A of the first planetary gear set 114 is coupled to a ground or transmission housing 140. The second node 114B of the first planetary gear set 114 is coupled to the second node 116B of the second planetary gear set 116. The first node 116A of the second planetary gear set 116 is coupled to the first node 118A of the third planetary gear set 118. The second node 118B of the third planetary gear set 118 is coupled to a second node 120B of the fourth planetary gear set 120. The third node 118C of the third planetary gear set 118 is coupled to the third node 120C of the fourth planetary gear set 120.

A first clutch 126 selectively connects the third node 114C of the first planetary gear set 114 to the first node 120A of the fourth planetary gear set 120. A second clutch 128 selectively connects the third node 116C of the second planetary gear set 116 to the third node 118C of the third planetary gear set 118 and to the output 122. A third clutch 130 selectively connects the third node 114C of the first planetary gear set 114 to the first node 116A of the second planetary gear set 116. A fourth clutch 132 selectively connects the second node 114B of the first planetary gear set 114 and the second node 116B of the second planetary gear set 116 to the first node 116A of the second planetary gear set 116. A first brake 134 selectively connects the second node 120B of the fourth planetary gear set 120 to the ground or transmission housing 140.

Figures 5, 6:
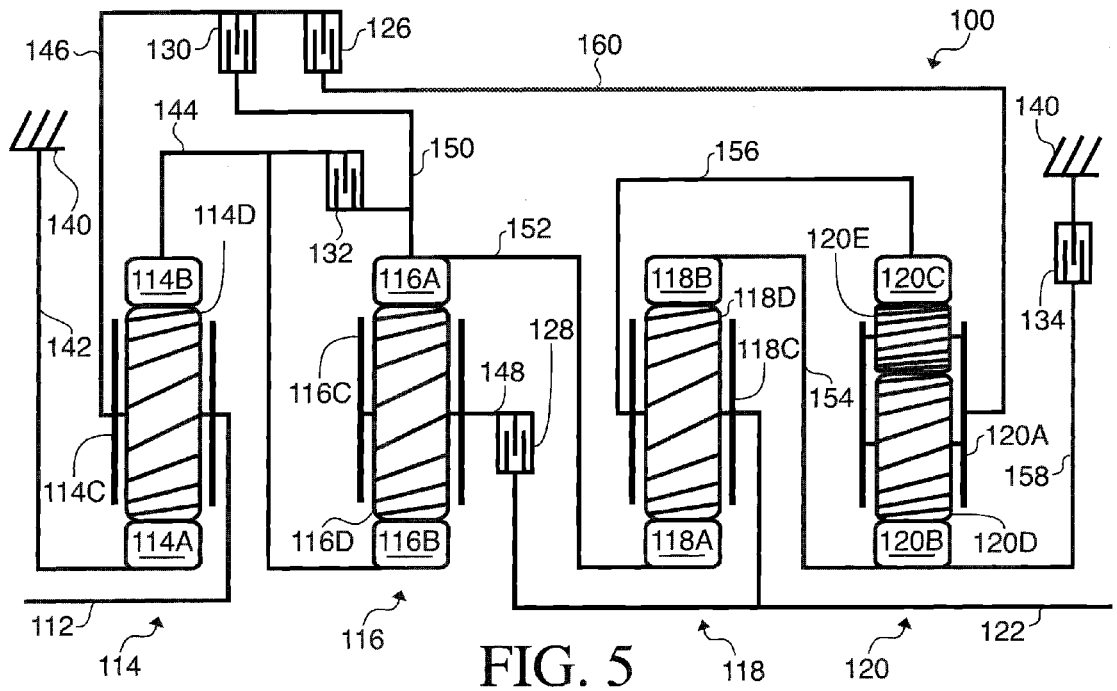
FIG. 5 is a diagrammatic view of another embodiment of an eight speed transmission according to the present invention.
FIG. 6 is a truth table presenting the state of engagement of the various torque transmitting clutches and brakes in each of the available forward and reverse speeds or gear ratios of the transmission illustrated in FIGS. 4 and 5.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 114 is a planetary gear set that includes a sun gear member 114A, a planet gear carrier member 114C and a ring gear member 114B. Sun gear member 114A is connected for common rotation with a first shaft or interconnecting member 142 which is permanently connected to the ground 140. Ring gear member 114B is connected to a second shaft or interconnecting member 144. The planet gear carrier member 114C rotatably supports a set of planet gears 114D (only one shown) and is connected for common rotation with a third shaft or interconnecting member 146 and the input 112. Planet gears 114D are configured to intermesh with sun gear member 114A and ring gear member 114B.

The input shaft or member 112 is continuously connected to an engine (not shown) or to a turbine of a torque converter (not shown). The output shaft or member 122 is continuously connected with the final drive unit or transfer case (not shown).

Planetary gear set 116 is a planetary gear set that includes a sun gear member 116B, a planet carrier member 116C that rotatably supports a set of planet gears 116D and a ring gear member 116A. Sun gear member 116B is connected for common rotation with the second interconnecting member 144. Planet carrier member 116C is connected for common rotation with a fourth shaft or interconnecting member 148. Ring gear member 116A is connected for common rotation with a fifth shaft or interconnecting member 150 and with a sixth shaft or interconnecting member 152. Planet gears 116D are configured to intermesh with both sun gear member 116B and ring gear member 116A.

Planetary gear set 118 is a planetary gear set that includes a sun gear member 118A, a ring gear member 118B and a planet carrier member 118C that rotatably supports a set of planet gears 118D. Sun gear member 118A is connected for common rotation with the sixth interconnecting member 152. Ring gear member 118B is connected for common rotation with a seventh shaft or interconnecting member 154. Planet carrier member 118C is connected for common rotation with an eighth shaft or interconnecting member 156 and to the output 122. Planet gears 118D are configured to intermesh with both sun gear member 118A and ring gear member 118B.

Planetary gear set 120 is a planetary gear set that includes a sun gear member 120B, a ring gear member 120C and a planet carrier member 120A that rotatably supports a first set of planet gears 120D and a second set of planet gears 120E. Sun gear member 120B is connected for common rotation with the seventh interconnecting member 154 and to a ninth shaft or interconnecting member 158. Ring gear member 120C is connected for common rotation with the eighth interconnecting member 156. Planet carrier member 120A is connected for common rotation with a tenth shaft or interconnecting member 160. The first planet gears 120D are configured to intermesh with the sun gear member 120B and the second planet gears 120E are configured to intermesh with the ring gear member 120C. The first and second planet gears 120D and 120E are configured to intermesh with one another.

The torque-transmitting mechanisms or clutches 126, 128, 130, and 132 and the brake 134 allow for selective interconnection of the shafts or interconnecting members, members of the planetary gear sets and the housing. For example, the first clutch 126 is selectively engageable to connect the third interconnecting member 146 to the tenth interconnecting member 160. The second clutch 128 is selectively engageable to connect the fourth interconnecting member 148 to the output 122. The third clutch 130 is selectively engageable to connect the third interconnecting member 146 to the fifth interconnecting member 150. The fourth clutch 132 is selectively engageable to connect the second interconnecting member 144 to the fifth interconnecting member 150. The first brake 134 is selectively engageable to connect the ninth interconnecting member 158 to the ground 140 to restrict rotation of the ninth interconnecting member 158 relative to the ground 140.

Referring now to FIGS. 5 and 6, the operation of the embodiment of the eight speed transmission 100 will be described. It will be appreciated that the transmission 100 is capable of transmitting torque from the input shaft or member 112 to the output shaft or member 122 in at least eight forward speeds or torque ratios and at least one reverse speed or torque ratio. Each forward and reverse speed or torque ratio is attained by engagement of one or more of the torque-transmitting mechanisms (i.e. first clutch 126, second clutch 128, third clutch 130, fourth clutch 132, and first brake 134), as will be explained below. FIG. 6 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG.

6. Of course, other gear ratios are achievable depending on the gear diameter, gear teeth count and gear configuration selected.

To establish reverse gear, the first brake 134 and the second clutch 128 are engaged or activated. The first brake 134 connects the ninth interconnecting member 158 to the ground 140 to restrict rotation of the ninth interconnecting member 158 relative to the ground 140. The second clutch 128 connects the fourth interconnecting member 148 to the output 122. Likewise, the eight forward ratios are achieved through different combinations of clutch and brake engagement, as shown in FIG. 6.

It will be appreciated that the foregoing explanation of operation and gear states of the eight speed transmission 100 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
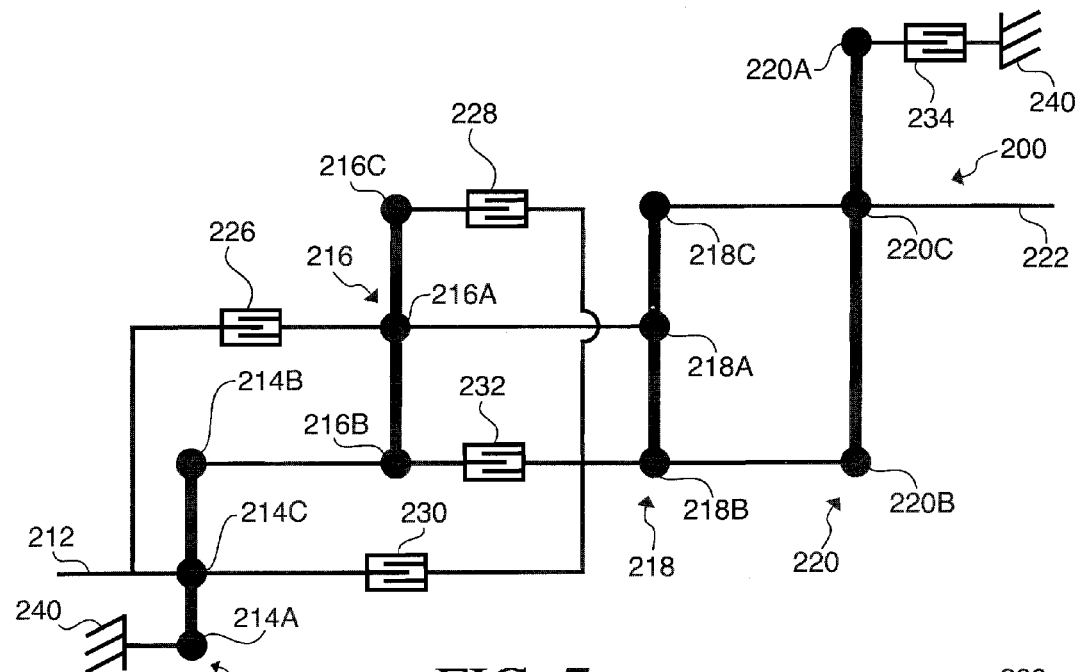
FIG. 7 is a lever diagram of another embodiment of an eight speed transmission according to the present invention.

Referring now to FIG. 7, another embodiment of a transmission is illustrated and referenced by reference numeral 200. Transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222.

The input 212 is coupled to the third node 214C of the first planetary gear set 214. The output 222 is coupled to the third node 220C of the fourth planetary gear set 220. The first node 214A of the first planetary gear set 214 is coupled to a ground or transmission housing 240. The second node 214B of the first planetary gear set 214 is coupled to the second node 216B of the second planetary gear set 216. The first node 216A of the second planetary gear set 216 is coupled to the first node 218A of the third planetary gear set 218. The second node 218B of the third planetary gear set 218 is coupled to a second node 220B of the fourth planetary gear set 220. The third node 218C of the third planetary gear set 218 is coupled to the third node 220C of the fourth planetary gear set 220.

A first clutch 226 selectively connects the input 212 and the third node 214C of the first planetary gear set 214 to the first node 216A of the second planetary gear set 216. A second clutch 228 selectively connects the third node 216C of the second planetary gear set 216 to the second node 218B of the third planetary gear set 218. A third clutch 230 selectively connects the input 212 and the third node 214C of the first planetary gear set 214 to the second node 218B of the third planetary gear set 218. A fourth clutch 232 selectively connects the second node 216B of the second planetary gear set 216 to the second node 218B of the third planetary gear set 218. A first brake 234 selectively connects the first node 220A of the fourth planetary gear set 220 to the ground or transmission housing 240.

Figure 8:
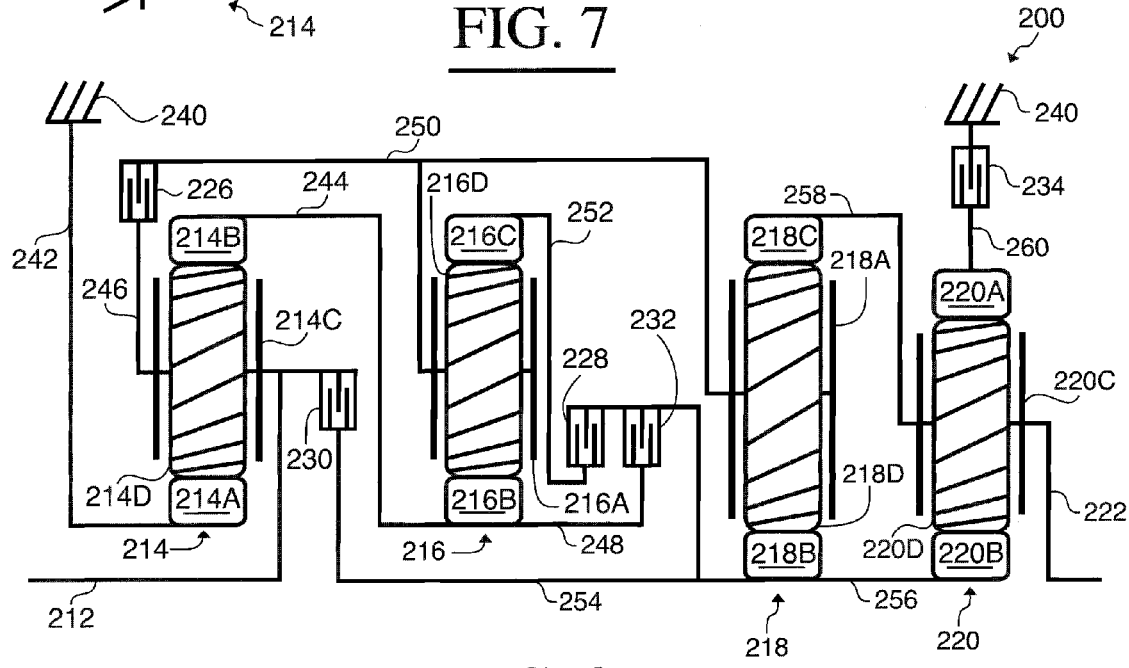
FIG. 8 is a diagrammatic view of another embodiment of an eight speed transmission according to the present invention.

Referring now to FIG. 8, a stick diagram presents a schematic layout of the embodiment of the eight speed transmission 200 according to the present invention. In FIG. 8, the numbering from the lever diagram of FIG. 7 is carried over. The clutches, brakes and couplings are correspondingly presented whereas the nodes of the planetary gear sets now appear as components of planetary gear sets such as sun gears, ring gears, planet gears and planet gear carriers.

For example, planetary gear set 214 is a planetary gear set that includes a sun gear member 214A, a planet gear carrier member 214C and a ring gear member 214B. Sun gear member 214A is connected for common rotation with a first shaft or interconnecting member 242 which is permanently connected to the ground 240. Ring gear member 214B is connected to a second shaft or interconnecting member 244. The planet gear carrier member 214C rotatably supports a set of planet gears 214D (only one shown) and is connected for common rotation with a third shaft or interconnecting member 246 and the input 212. Planet gears 214D are configured to intermesh with sun gear member 214A and ring gear member 214B.

The input shaft or member 212 is continuously connected to an engine (not shown) or to a turbine of a torque converter (not shown). The output shaft or member 222 is continuously connected with the final drive unit or transfer case (not shown).

Planetary gear set 216 is a planetary gear set that includes a sun gear member 216B, a planet carrier member 216A that rotatably supports a set of planet gears 216D and a ring gear member 216C. Sun gear member 216B is connected for common rotation with the second interconnecting member 244 and with a fourth shaft or interconnecting member 248. Planet carrier member 216A is connected for common rotation with a fifth shaft or interconnecting member 250. Ring gear member 216C is connected for common rotation with a sixth shaft or interconnecting member 252. Planet gears 216D are configured to intermesh with both sun gear member 216B and ring gear member 216C.

Planetary gear set 218 is a planetary gear set that includes a sun gear member 218B, a ring gear member 218C and a planet carrier member 218A that rotatably supports a set of planet gears 218D. Sun gear member 218B is connected for common rotation with a seventh shaft or interconnecting member 254 and to an eighth shaft or interconnecting member 256. Ring gear member 218C is connected for common rotation with a ninth shaft or interconnecting member 258. Planet carrier member 218A is connected for common rotation with the fifth interconnecting member 250. Planet gears 218D are configured to intermesh with both sun gear member 218B and ring gear member 218C.

Planetary gear set 220 is a planetary gear set that includes a sun gear member 220B, a ring gear member 220A and a planet carrier member 220C that rotatably supports a set of planet gears 220D. Sun gear member 220B is connected for common rotation with the eighth interconnecting member 256. Ring gear member 220A is connected for common rotation with a tenth shaft or interconnecting member 260. Planet carrier member 220C is connected for common rotation with the ninth interconnecting member 258 and with the output 222. Planet gears 220D are configured to intermesh with both sun gear member 220B and ring gear member 220A.

The torque-transmitting mechanisms or clutches 226, 228, 230, and 232 and the brake 234 allow for selective interconnection of the shafts or interconnecting members, members of the planetary gear sets and the housing. For example, the first clutch 226 is selectively engageable to connect the third interconnecting member 246 to the fifth interconnecting member 250. The second clutch 228 is selectively engageable to connect the sixth interconnecting member 252 to the seventh interconnecting member 254. The third clutch 230 is selectively engageable to connect the input 212 to the seventh interconnecting member 254. The fourth clutch 232 is selectively engageable to connect the fourth interconnecting member 248 to the seventh interconnecting member 254. The first brake 234 is selectively engageable to connect the tenth interconnecting member 260 to ground 240 to restrict rotation of the tenth interconnecting member 260 relative to the ground 240.

Referring now to FIGS. 8 and 9, the operation of the embodiment of the eight speed transmission 200 will be described. It will be appreciated that the transmission 200 is capable of transmitting torque from the input shaft or member 212 to the output shaft or member 222 in at least eight forward speeds or torque ratios and at least one reverse speed or torque ratio. Each forward and reverse speed or torque ratio is attained by engagement of one or more of the torque-transmitting mechanisms (i.e. first clutch 226, second clutch 228, third clutch 230, fourth clutch 232, and first brake 234), as will be explained below. FIG. 9 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish reverse gear, the first brake 234 and the second clutch 228 are engaged or activated. The first brake 234 connects the tenth interconnecting member 260 to ground 240 to restrict rotation of the tenth interconnecting member 260 relative to the ground 240. The second clutch 228 connects the sixth interconnecting member 252 to the seventh interconnecting member 254. Likewise, the eight forward ratios are achieved through different combinations of clutch and brake engagement, as shown in FIG. 9.

It will be appreciated that the foregoing explanation of operation and gear states of the eight speed transmission 200 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members, wherein the input member is continuously interconnected with the second member of the first planetary gear set and the output member is continuously interconnected with the second member of the fourth planetary gear set;
a first interconnecting member continuously interconnecting the first member of the first planetary gear set with a stationary element;
a second interconnecting member continuously interconnecting the third member of the first planetary gear set with the first member of the second planetary gear set;
a third interconnecting member continuously interconnecting the third member of the second planetary gear set with the third member of the third planetary gear set;
a fourth interconnecting member continuously interconnecting the first member of the third planetary gear set with the third member of the fourth planetary gear set;
a fifth interconnecting member continuously interconnecting the second member of the third planetary gear set with the second member of the fourth planetary gear set; and
five torque transmitting mechanisms each selectively engageable to interconnect at least one of the first, second, and third members with another of at least one of the first, second, third members, and the stationary element; and
wherein the torque transmitting mechanisms are selectively engageable in combinations of at least two to establish at least eight forward speed ratios and at least one reverse speed ratio between the input member and the output member; and
wherein a first of the five torque transmitting mechanisms is selectively engageable to interconnect the second member of the first planetary gear set with the first member of the third planetary gear set.

2. The transmission of claim 1 wherein a second of the five torque transmitting mechanisms is selectively engageable to interconnect the second member of the first planetary gear set with the third member of the second planetary gear set.

3. The transmission of claim 2 wherein a third of the five torque transmitting mechanisms is selectively engageable to interconnect the second member of the second planetary gear set with the first member of the third planetary gear set.

4. The transmission of claim 3 wherein a fourth of the five torque transmitting mechanisms is selectively engageable to interconnect the third member of the first planetary gear set with the first member of the third planetary gear set.

5. The transmission of claim 4 wherein a fifth of the five torque transmitting mechanisms is selectively engageable to interconnect the first member of the fourth planetary gear set with the stationary element.

6. The transmission of claim 1 wherein the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a ring gear, the third member of the second planetary gear set is a carrier member, the first member of the third planetary gear set is a sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

7. The transmission of claim 1 wherein the five torque transmitting mechanisms include four clutches and one brake.

8. A transmission comprising:
an input member;
an output member;
first, second, third and fourth planetary gear sets each having first, second and third members, wherein the input member is continuously interconnected with the second member of the first planetary gear set and wherein the output member is continuously interconnected with the second member of the fourth planetary gear set;
a first interconnecting member continuously interconnecting the first member of the first planetary gear set with a stationary element;

a second interconnecting member continuously interconnecting the third member of the first planetary gear set with the first member of the second planetary gear set;
a third interconnecting member continuously interconnecting the third member of the second planetary gear set with the third member of the third planetary gear set;
a fourth interconnecting member continuously interconnecting the first member of the third planetary gear set with the third member of the fourth planetary gear set;
a fifth interconnecting member continuously interconnecting the second member of the third planetary gear set with the second member of the fourth planetary gear set;
a first torque transmitting mechanism selectively engageable to interconnect the second member of the first planetary gear set with the third member of the second planetary gear set;
a second torque transmitting mechanism selectively engageable to interconnect the second member of the first planetary gear set with the first member of the third planetary gear set;
a third torque transmitting mechanism selectively engageable to interconnect the second member of the second planetary gear set with the first member of the third planetary gear set;
a fourth torque transmitting mechanism selectively engageable to interconnect the third member of the first planetary gear set with the first member of the third planetary gear set; and
a fifth torque transmitting mechanism selectively engageable to interconnect the first member of the fourth planetary gear set with the stationary element; and
wherein the torque transmitting mechanisms are selectively engageable in combinations of at least two to establish at least eight forward speed ratios and at least one reverse speed ratio between the input member and the output member.

9. The transmission of claim 8 wherein the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a ring gear, the third member of the second planetary gear set is a carrier member, the first member of the third planetary gear set is a sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

10. A transmission comprising:
an input member;
an output member;
first, second, third and fourth planetary gear sets each having a sun gear, a carrier member, and a ring gear, wherein the input member is continuously interconnected with the carrier member of the first planetary gear set and wherein the output member is continuously interconnected with the carrier member of the fourth planetary gear set;
a first interconnecting member continuously interconnecting the sun gear of the first planetary gear set with a stationary element;
a second interconnecting member continuously interconnecting the ring gear of the first planetary gear set with the sun gear of the second planetary gear set;
a third interconnecting member continuously interconnecting the carrier member of the second planetary gear set with the carrier member of the third planetary gear set;
a fourth interconnecting member continuously interconnecting the sun gear of the third planetary gear set with the sun gear of the fourth planetary gear set;
a fifth interconnecting member continuously interconnecting the ring gear of the third planetary gear set with the carrier member of the fourth planetary gear set;
a first torque transmitting mechanism selectively engageable to interconnect the carrier member of the first planetary gear set with the carrier member of the second planetary gear set;
a second torque transmitting mechanism selectively engageable to interconnect the carrier member of the first planetary gear set with the sun gear of the third planetary gear set;
a third torque transmitting mechanism selectively engageable to interconnect the ring gear of the second planetary gear set with the sun gear of the third planetary gear set;
a fourth torque transmitting mechanism selectively engageable to interconnect the ring gear of the first planetary gear set with the sun gear of the third planetary gear set; and
a fifth torque transmitting mechanism selectively engageable to interconnect the ring gear of the fourth planetary gear set with the stationary element; and
wherein the torque transmitting mechanisms are selectively engageable in combinations of at least two to establish at least eight forward speed ratios and at least one reverse speed ratio between the input member and the output member.

* * * * *